US008920989B2

(12) United States Patent
Son (10) Patent No.: US 8,920,989 B2
(45) Date of Patent: Dec. 30, 2014

(54) FUEL REFORMING APPARATUS, AND FUEL CELL SYSTEM INCLUDING SAME (75) Inventor: In-Hyuk Son, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1766 days.

(21) Appl. No.: 12/040,700

(22) Filed: Feb. 29, 2008

(65) Prior Publication Data
US 2008/0268305 A1 Oct. 30, 2008

(30) Foreign Application Priority Data

Apr. 25, 2007 (KR) ........................ 10-2007-0040250

(51) Int. Cl.
*H01M 8/06* (2006.01)
*B01J 19/24* (2006.01)
*C01B 3/38* (2006.01)
*H01M 8/10* (2006.01)

(52) U.S. Cl.
CPC ......... *C01B 3/382* (2013.01); *C01B 2203/1294* (2013.01); *B01J 2219/0004* (2013.01); *C01B 2203/1047* (2013.01); *B01J 19/2485* (2013.01); *C01B 2203/0283* (2013.01); *B01J 2219/00159* (2013.01); *B01J 2219/00157* (2013.01); *Y02E 60/50* (2013.01); *H01M 8/0668* (2013.01); *H01M 2008/1095* (2013.01); *C01B 2203/0244* (2013.01); *H01M 8/0618* (2013.01); *C01B 2203/0261* (2013.01); *C01B 2203/1023* (2013.01); *C01B 2203/066* (2013.01); *C01B 2203/107* (2013.01); *H01M 8/0631* (2013.01); *C01B 2203/1041* (2013.01); *C01B 2203/1076* (2013.01); *C01B 3/386* (2013.01); *B01J 2219/00155* (2013.01); *C01B 2203/1064* (2013.01)
USPC .......................................... 429/422; 429/423

(58) Field of Classification Search
USPC ................. 429/423, 425, 416, 417, 422, 433; 422/187, 188, 190, 192, 193, 202, 198, 422/146; 48/61, 127.9; 502/56, 31, 49, 53
See application file for complete search history.

(56) References Cited

U.S. PATENT DOCUMENTS

| 7,365,102 | B1* | 4/2008 | Weissman ...................... 518/700 |
| 2005/0118089 | A1* | 6/2005 | Abbott et al. .............. 423/418.2 |
| 2009/0011291 | A1* | 1/2009 | Herling et al. ................... 429/17 |
| 2010/0200811 | A1* | 8/2010 | Kuperman et al. ........... 252/373 |

FOREIGN PATENT DOCUMENTS

| JP | 06-219706 | * | 8/1994 | .............. B01J 19/00 |
| JP | 2001-226105 | A | 8/2001 | |
| JP | 2004-155629 | A | 6/2004 | |
| JP | 2005-145749 | A | 6/2005 | |
| KR | 10-0498159 | B1 | 7/2005 | |

* cited by examiner

*Primary Examiner* — Raymond Alejandro
(74) *Attorney, Agent, or Firm* — Christie, Parker & Hale, LLP (57) ABSTRACT Fuel reforming apparatus and fuel cell systems including the same are provided. The fuel reforming apparatus includes a reactor main body; a catalyst reaction region inside the reactor main body for generating a reforming gas containing hydrogen by promoting at least a partial oxidation (POX) reaction of a reactant containing a hydrocarbon fuel and an oxidant; and a heat-insulating member inside the reactor main body surrounding the catalyst reaction region for insulating heat generated by the POX reaction.

22 Claims, 5 Drawing Sheets

FUEL REFORMING APPARATUS, AND FUEL CELL SYSTEM INCLUDING SAME

CROSS-REFERENCE TO RELATED APPLICATION

This application claims priority to and the benefit of Korean Patent Application No. 10-2007-0040250 filed in the Korean Intellectual Property Office on Apr. 25, 2007, the entire content of which is incorporated herein by reference.

BACKGROUND OF THE INVENTION

1. Field of the Invention

The present invention relates to fuel reforming apparatuses and fuel cell systems including the same. More particularly, the invention is directed to a reformer for a fuel cell, in which a reforming gas is generated in a partial oxidation reaction or an auto-thermal reforming reaction of a fuel.

2. Description of the Related Art

As is well known, a fuel cell is an electricity generating system for generating electrical energy using a fuel and an oxidant gas. The fuel cell may be either a polymer electrolyte membrane fuel cell or a direct oxidation membrane fuel cell.

A polymer electrolyte membrane fuel cell receives a reforming gas (generated in a reforming apparatus) and an oxidant gas that is different from the reforming gas. The polymer electrolyte membrane fuel cell thus generates electrical energy by an oxidation reaction of hydrogen contained in the reforming gas and an electrochemical reaction of oxygen contained in the oxidant gas.

The fuel reforming apparatus has a structure in which the reforming gas (rich in hydrogen) is generated in a steam reforming (SR) reaction, a partial oxidation (POX) reaction, or an auto-thermal reforming (ATR) reaction of a fuel by the use of a catalyst.

The SR reaction yields relatively high hydrogen production as well as stability. However, high heat energy has to be externally provided since the SR reaction is an endothermic reaction requiring a large amount of heat. Furthermore, in terms of chemical equilibrium, the apparatus increases in size due to a limited conversion rate and a low reaction speed.

The POX reaction is a sort of exothermic reaction. Thus, in comparison with the SR reaction, heat supply is decreased and reaction speed is increased, thereby permitting a small-sized apparatus with a high conversion rate.

The ATR reaction is a reaction in which the SR and POX reactions of the fuel simultaneously occur, resulting in a fast reaction speed and response.

In a conventional fuel reforming apparatus, when a reforming gas is generated by a POX reaction or an ATR reaction of a fuel by the use of a catalyst, the catalyst generates heat having a temperature of approximately 700° C. or greater. As a result, a hot-spot phenomenon occurs in conventional fuel reforming apparatuses. The hot-spot phenomenon is a phenomenon in which heat generated by a catalyst is concentrated on the interior wall of a reactor made of a metal material. The interior wall is thus easily oxidized and coke is formed inside the reactor due to oxide particles.

Accordingly, in conventional fuel reforming apparatuses reactants containing fuel cannot be smoothly transferred since the coke is formed when the interior wall of the reactor is oxidized due to the hot-spot phenomenon. In addition, catalyst reaction efficiency deteriorates, and durability and reliability of the entire apparatus are degraded.

The information disclosed in this Background section is presented only as background information on the invention, and may contain information that is not prior art or that is already known to a person of ordinary skill in the art.

SUMMARY OF THE INVENTION

In one embodiment of the present invention, a fuel reforming apparatus generates a reforming gas by a partial oxidation reaction or an auto-thermal reforming reaction. An exemplary embodiment of the present invention provides a fuel reforming apparatus that can protect a reactor against oxidation by heat energy generated in a partial oxidation reaction or an auto-thermal reforming reaction and that can suppress coke formation caused by oxide particles.

According to an embodiment of the present invention, a fuel reforming apparatus includes a reactor main body; a catalyst reaction region inside the reactor main body for generating a reforming gas containing hydrogen by promoting at least a partial oxidation (POX) reaction of a reactant containing a hydrocarbon fuel and an oxidant; and a heat-insulating member inside the reactor main body surrounding the catalyst reaction region for insulating heat generated by the POX reaction.

The heat-insulating member may be separately disposed inside the reactor main body.

The heat-insulating member may be made of a single crystal material. For example, the heat-insulating member may be composed of a quartz tube.

The fuel reforming apparatus may further include a coating layer made of a metal material and may be formed on the outer circumferential surface of the heat-insulating member. For example, the coating layer may be made of gold.

The fuel reforming apparatus may further include a packing member made of a flame-retardant material and may be formed between the inner circumferential surface of the reactor main body and the outer circumferential surface of the heat-insulating member. For example, the packing member may be made of quartz wool or glass wool.

The fuel reforming apparatus may include a POX reactor for generating the reforming gas by the POX reaction of the reactant.

The fuel reforming apparatus may alternatively include an auto-thermal reforming (ATR) reactor in which the reforming gas is generated by the POX reaction and a steam reforming (SR) reaction of the reactant. For example, the reactant may further contain water.

The catalyst reaction region may include a monolithic-type catalyst forming material inside the reactor main body and a catalyst layer coated over the catalyst forming material.

The catalyst forming material may form a plurality of paths in a longitudinal direction in the reactor main body and then form a catalyst layer on the interior wall of each path. In this case, the catalyst layer may include a catalyst material selected from Pt, Ru, Pd, Rh, Ir and combinations thereof.

The reactor main body may be generally tubular. In this case, the reactor main body may be made of Steel Use Stainless (SUS).

The fuel reforming apparatus may further include an igniter at one end of the reactor main body for combustion of the reactant inside the reactor main body, so that the catalyst reaction region can be heated to a unique reaction start temperature when the fuel reforming apparatus initially operates.

The fuel reforming apparatus may further include a reactant inlet at one end of the reactor main body for injecting the reactant into the reactor main body; and a reforming gas outlet at the other end of the reactor main body for discharging the reforming gas.

The fuel reforming apparatus may further include an evaporator on the reactor main body for evaporating water contained in the reactant. The evaporator may include a coil-shaped pre-heater that contacts the outer circumferential surface of the reactor main body and that forms a path for the reactant. In this case, the internal space of the reactor main body may be divided into a first section where the heat-insulating member is disposed, and a second section corresponding to an outer area of the heat-insulating member. The pre-heater may be disposed on the outer circumferential surface of the reactor main body corresponding to the second section.

The fuel reforming apparatus may further include a carbon monoxide reducing region inside the reactor main body for reducing the concentration of carbon monoxide contained in the reforming gas. The carbon monoxide reducing region may include a second catalyst reaction region for promoting a water gas shift (WGS) reaction of the reforming gas. In this case, the second catalyst reaction region may be formed inside the heat-insulating member.

The second catalyst reaction region may include a monolithic-type second catalyst forming material and a second catalyst layer coated over the second catalyst forming material.

The fuel may be a liquefied gas that exists in a gaseous state at room temperature. In this case, the fuel may have a main component selected from methane, ethane, propane, butane and combinations thereof.

According to another embodiment of the present invention, a fuel reforming apparatus includes a reactor main body in which a duct is formed; a quartz tube inside the reactor main body; and a catalyst reaction region inside the quartz tube for generating a reforming gas containing hydrogen by a reforming reaction of a reactant containing a hydrocarbon fuel and an oxidant.

The reforming gas may be generated by a partial oxidation (POX) reaction of the reactant.

The reforming gas may alternatively be generated by an auto-thermal reforming (ATR) reaction of the reactant.

BRIEF DESCRIPTION OF THE DRAWINGS

The above and other features and advantages of the present invention will become more apparent by reference to the following detailed description when considered in conjunction with the attached drawings, in which.

DETAILED DESCRIPTION OF THE EMBODIMENTS

The present invention will be now described with reference to the accompanying drawings, in which certain exemplary embodiments of the invention are shown. As those skilled in the art would realize, the described embodiments may be modified in various different ways without departing from the spirit or scope of the present invention.

Figure 1:
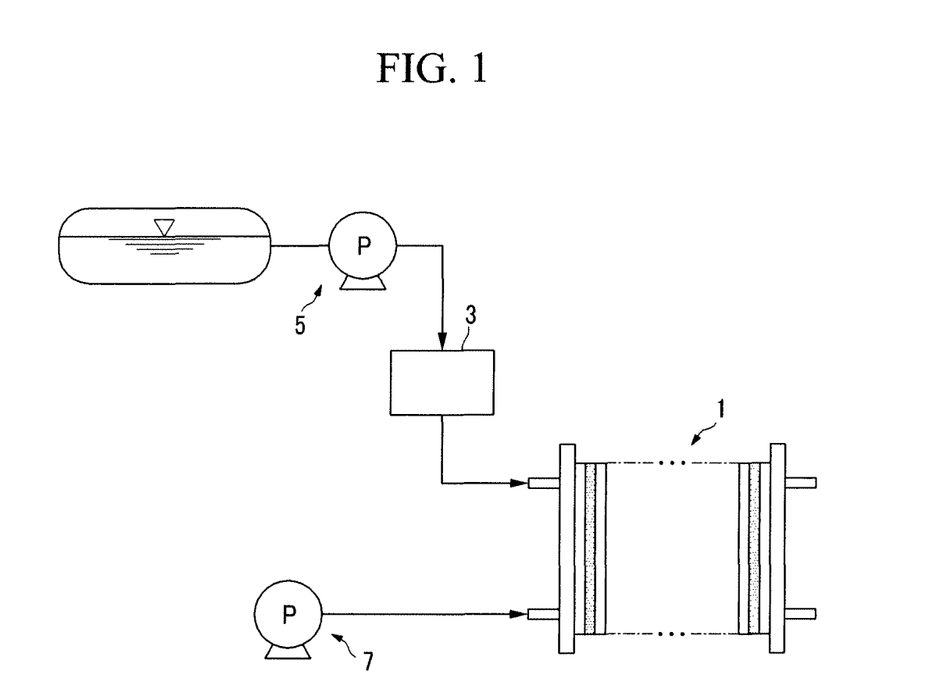
FIG. 1 is a schematic diagram of a structure of a fuel cell system according to one embodiment of the present invention.

FIG. 1 is a schematic diagram of the structure of a fuel cell system according to one embodiment of the present invention. As shown in FIG. 1, the fuel cell system includes a stack including an electricity generating element 1 that generates electrical energy through electrochemical reactions, a fuel reforming apparatus 3 that generates hydrogen gas from a liquid fuel and supplies the hydrogen gas, a fuel supplier 5 for supplying a fuel to the fuel reforming apparatus 3, an oxidant supplier 7 for supplying an oxidant to the fuel reforming apparatus 3 and the electricity generating element 1.

Figure 2:
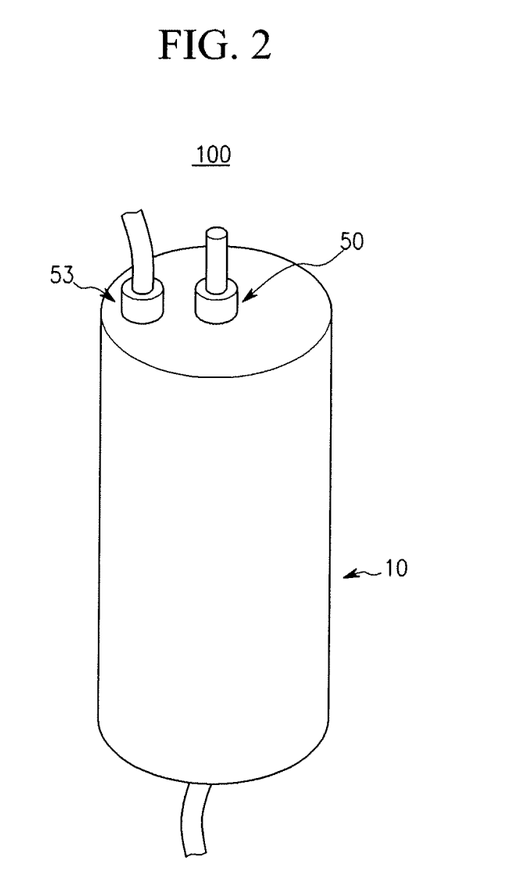
FIG. 2 is a perspective view of a fuel reforming apparatus according to one embodiment of the present invention.
Figure 3:
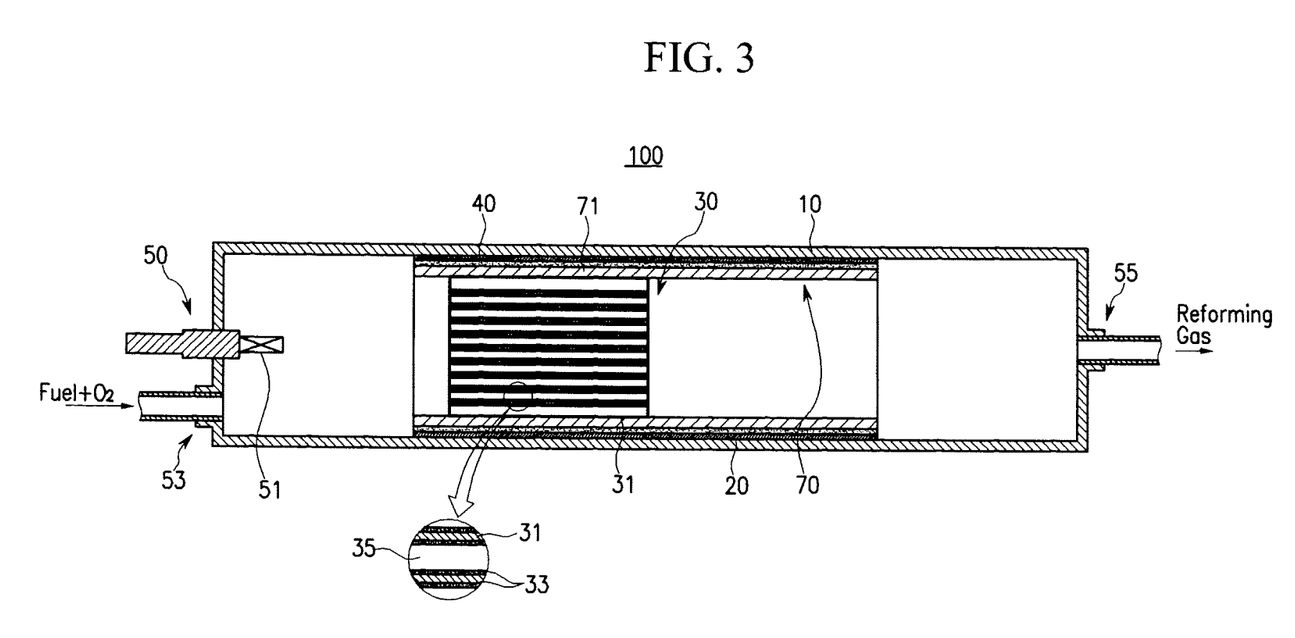
FIG. 3 is a schematic cross-sectional view of the fuel reforming apparatus of FIG. 2.

FIG. 2 is a perspective view of a fuel reforming apparatus according to one embodiment of the present invention, and FIG. 3 is a schematic cross-sectional view of the fuel reforming apparatus of FIG. 2. Referring to FIGS. 2 and 3, a fuel reforming apparatus 100 includes a fuel processor that generates a reforming gas containing hydrogen by a partial oxidation (POX) reaction of a fuel.

The fuel reforming apparatus 100 supplies the reforming gas to a typical polymer electrolyte membrane fuel cell. The polymer electrolyte membrane fuel cell has a structure in which electrical energy is generated by an oxidation reaction of the reforming gas and by a reduction reaction of an oxidant such as air.

The fuel may be compressed and stored while partially liquefied in a specific container. Also, the fuel may include a liquefied gas that exists in a gaseous state at room temperature. The fuel may be a hydrocarbon liquefied gas having a main component of methane, ethane, propane, or butane.

In the present embodiment, the fuel reforming apparatus 100 may include a POX reactor. Since the POX reaction of the fuel is a sort of exothermic reaction as expressed by Chemical Formula 1, the POX reactor can achieve a fast response speed with less heat supply compared with a steam reforming (SR) reaction as expressed by Chemical Formula 2. Further, the entire apparatus can be produced in a compact size.

$$CH_4 + \tfrac{1}{2}O_2 \rightarrow CO + 2H_2 \quad \text{Chemical Formula 1}$$

$$\Delta H_{298} = -36 \text{ kJ/mol}$$

$$CH_4 + H_2O \rightarrow CO + 3H_2 \quad \text{Chemical Formula 2}$$

$$\Delta H_{298} = 206 \text{ kJ/mol}$$

The fuel reforming apparatus 100 includes a reactor main body 10 and a first catalyst reaction region 30 inside the reactor main body 10. The reactor main body 10 may be generally tubular with both ends substantially closed and sealed. The reactor main body 10 may be made of a typical metal material, for example, a Steel Use Stainless (SUS) material.

The first catalyst reaction region 30 serves to generate a reforming gas containing hydrogen by promoting a POX reaction of a fuel and an oxidant (hereinafter, referred to as a reactant) as an exothermic reaction.

The first catalyst reaction region 30 includes a monolithic-type first catalyst forming material 31 and a first catalyst layer 33 coated over the first catalyst forming material 31.

The first catalyst forming material 31 is disposed inside the reactor main body 10, and is produced as a monolithic module by extruding a ceramic material or a metal material. The first catalyst forming material 31 forms a plurality of honeycomb-shaped first paths 35 parallel to the reactant flow direction.

The first catalyst layer 33 is coated on the interior walls of the plurality of first paths 35 of the first catalyst forming material 31. The first catalyst layer 33 is made of a typical catalyst material, nonlimiting examples of which include platinum (Pt), ruthenium (Ru), palladium (Pd), rhodium (Rh), and iridium (Ir)), that can promote the POX reaction of the reactant.

When the fuel reforming apparatus 100 having the aforementioned structure initially operates, the POX reaction of the reactant cannot occur in the first catalyst reaction region 30 at room temperature. Thus, heat energy with a reaction start temperature for the POX reaction of the reactant is provided to the first catalyst reaction region 30. Therefore, the fuel reforming apparatus 100 according to the present embodiment includes an igniter 50 at one end of the reactor main body 10.

In order to heat the first catalyst reaction region 30 when the fuel reforming apparatus 100 initially operates, the igniter 50 has a structure by which it ignites a reactant injected into the reactor main body 10 by generating a spark.

The igniter 50 may be a typical igniting device for electrically generating a spark. The igniter 50 includes a spark generator 51 for generating a spark by receiving electrical power. The igniter 50 has the same structure as typical igniting devices widely used in the art, and thus a detailed description thereof will be omitted.

Therefore, when the fuel reforming apparatus 100 according to the present embodiment initially operates, the first catalyst reaction region 30 can be heated to a specific temperature range by combusting the reactant injected into the reactor main body 10 utilizing the igniter 50.

As shown in FIGS. 2 and 3, a reactant inlet 53 is formed at one end of the reactor main body 10 for injecting the reactant into the reactor main body 10. A reforming gas outlet 55 is formed at the other end of the reactor main body 10 for discharging a reforming gas generated in the POX reaction of the reactant produced in the first catalyst reaction region 30.

The reactant inlet 53 is not limited to being separately formed at one end of the reactor main body 10 as shown. For example, the reactant inlet 53 may be integrally formed with the igniter 50.

When the fuel reforming apparatus 100 operates normally, while promoting the POX reaction of the reactant, the first catalyst reaction region 30 generates heat having a temperature ranging from about 600 to about 900° C. For example, SUS can generally be oxidized at a temperature of about 700° C. or greater.

The heat generated by the first catalyst reaction region 30 is concentrated on the interior wall of the reactor main body 10, and thus the interior wall may be oxidized. Therefore, oxide particles (e.g., oxides of Fe, Co, Cr, and Ni) are produced inside the reactor main body 10. These oxide particles act as precursors for forming coke.

The fuel reforming apparatus 100 according to the present embodiment includes a heat-insulating member 70 separately disposed inside the reactor main body 10. The heat-insulating member 70 prevents heat energy generated in the POX reaction of the reactant by the first catalyst reaction region 30 from being directly transferred to the interior wall of the reactor main body 10.

The heat-insulating member 70 is generally tubular with both ends being open, and has a duct with a cross-sectional area of smaller than that of the reactor main body 10.

The length of the heat-insulating member 70 ranges from about 3 to 5 times the length of the first catalyst forming material 31 of the first catalyst reaction region 30. Further, the heat-insulating member 70 is disposed in a coaxial direction relative to the reactor main body 10.

In one embodiment, the heat-insulating member 70 includes a quartz tube 71 made of a single crystal material. The quartz tube 71 serves to further improve reaction efficiency by isolating heat generated in the POX reaction of the reactant by the first catalyst reaction region 30. The quartz tube 71 also suppresses coke formation on the interior wall of the reactor main body 10.

The quartz tube 71 has a uniform thermal expansion and is thus highly resistant to thermal impact. Further, the quartz tube 71 has the unique characteristic of being made of a single crystal material in which heat is transferred only in the Y-axis direction (in FIG. 3) and not in the X-axis direction. Therefore, heat generated by the first catalyst reaction region 30 can be easily isolated.

A packing member 20 made of a flame-retardant material is formed between the outer circumferential surface of the quartz tube 71 and the interior wall of the reactor main body 10. The packing member 20 serves to prevent the quartz tube 71 from being broken by a force externally imposed on the reactor main body 10. The packing member 20 may be made of quartz wool or glass wool.

According to one embodiment, the heat-insulating member 70 including the quartz tube 71 is included inside the reactor main body 10 to prevent the interior wall of the reactor main body 10 from being oxidized when heat energy is produced in the POX reaction of the reactant. Furthermore, according to one embodiment, since oxide particles generated by the heat energy can be prevented, it is possible to suppress coke formation on the interior wall of the reactor main body 10.

In addition, the fuel reforming apparatus 100 according to one embodiment further includes a metal coating layer 40 formed on the outer circumferential surface of the heat-insulating member 70. The coating layer 40 may be made of gold. Because the quartz tube 71 has excellent optical transmittance, the gold coating layer 40 is formed on the outer circumferential surface of the heat-insulating member 70 to prevent radiation energy generated by the first catalyst reaction region 30 from being transferred to the interior wall of the reactor main body 10 through the quartz tube 71.

The operation of the fuel reforming apparatus 100 according to one embodiment will now be described. When the fuel reforming apparatus 100 initially operates, the reactant is injected inside the reactor main body 10 through the reactant inlet 53. Subsequently, the igniter 50 generates a spark to combust the reactant. Then, the first catalyst reaction region 30 is heated to a specific temperature range by using a flame and heat energy produced when the reactant is combusted.

Next, when the fuel reforming apparatus 100 normally operates, the reactant is supplied into the reactor main body 10 through the reactant inlet 53 while the igniter 50 is off.

Next, the first catalyst reaction region 30 promotes the POX reaction of the reactant by the first catalyst layer 33 to generate a reforming gas containing hydrogen. At this time, the reforming gas is discharged through the reforming gas outlet 55 of the reactor main body 10.

In this process, the heat generated inside the reactor main body 10 from the POX reaction of the reactant by the first catalyst reaction region 30 has a temperature of about 700° C. or more.

However, in one embodiment, since the heat-insulating member 70 including the quartz tube 71 is included in the reactor main body 10, heat energy transferred from the first catalyst reaction region 30 to the interior wall of the reactor main body 10 is partially blocked by the heat-insulating member 70. Therefore, according to one embodiment, the interior wall of the reactor main body 10 can be protected against oxidization when heat is generated in the POX reaction of the reactant. In addition, unlike in conventional apparatuses, since the formation of oxide particles can be prevented, it is possible to suppress coke formation on the interior wall of the reactor main body 10. The uniform thermal expansion and high resistance to thermal impact of the quartz tube 71 enables such operation. Further, the quartz tube 71 has low thermal conductivity, and has the unique characteristic of being made of a single crystal material in which heat is transferred only in the Y-axis direction and not in the X-axis direction.

Figure 4:
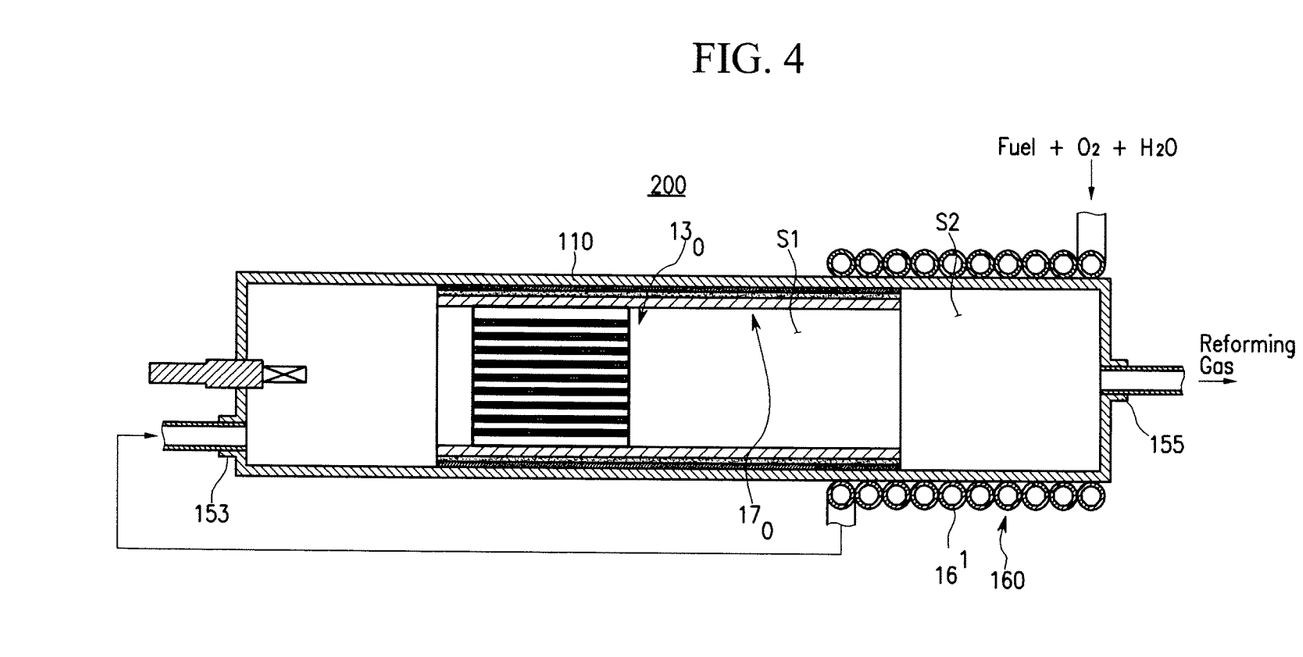
FIG. 4 is a schematic cross-sectional view of a fuel reforming apparatus according to another embodiment of the present invention.

FIG. 4 is a schematic cross-sectional view of a fuel reforming apparatus according to another embodiment of the present invention. Referring to FIG. 4, a fuel reforming apparatus 200 may include an auto-thermal reforming (ATR) reactor in which a POX reaction and an SR reaction of a reactant simultaneously occur.

The ATR reactor has a mechanism in which a POX reaction occurs for a short period of time as an exothermic reaction as expressed by Chemical Formula 3, gradually followed by an SR reaction as an endothermic reaction as expressed by Chemical Formula 4 and Chemical Formula 5.

$$CH_4 + 2O_2 \rightarrow CO_2 + 2H_2O \quad \text{Chemical Formula 3}$$

$$CH_4 + H_2O \rightarrow CO + 3H_2 \quad \text{Chemical Formula 4}$$

$$CH_4 + CO_2 \rightarrow 2CO + 2H_2 \quad \text{Chemical Formula 5}$$

Here, besides a fuel and an oxidant, the reactant may further contain water for promoting the SR reaction. Thus, while employing the basic structure of the embodiment of FIGS. 2 and 3, the fuel reforming apparatus 200 according to the present embodiment further includes an evaporator 160 for evaporating water contained in the reactant.

The evaporator 160 includes a pre-heater 161 in contact with the outer circumferential surface of the reactor main body 110. The pre-heater 161 forms a coil-shaped path wound around the outer circumferential surface of the reactor main body 110 so that the reactant can pass through the path.

The pre-heater 161 serves to evaporate water contained in the reactant by using heat energy provided from the reactor main body 110. The pre-heater 161 is generally tubular and is made of a thermally conductive metal material. In this case, the pre-heater 161 is connected to the reactant inlet 153 of the reactor main body 110.

The internal space of the reactor main body 110 may be divided into a first section S1 where the heat-insulating member 170 is disposed, and a second section S2 that corresponds to an area outside of the heat-insulating member 170 and is located near the reforming gas outlet 155, as shown in FIG. 4.

In one embodiment, the pre-heater 161 is coiled around the outer circumferential surface corresponding to the second section S2 of the reactor main body 110, so that heat energy generated in the second section S2 of the reactor main body 110 can be provided through the reactor main body 110.

Thus, in one embodiment, when the reactant is supplied to the pre-heater 161, the heat energy of the reactor main body 110 itself is transferred to the pre-heater 161, thereby evaporating water contained in the reactant. In this case, steam is injected into the reactor main body 110 along with the fuel and the oxidant.

Accordingly, a reforming gas containing hydrogen is generated inside the reactor main body 110 during an ATR reaction (i.e., in which a POX reaction and an SR reaction occur simultaneously) of the reactant by the first catalyst reaction region 130.

The remaining configuration and operation of the fuel reforming apparatus 200 according to the present embodiment are the same as those of the embodiment of FIGS. 2 and 3, and thus detailed descriptions thereof will not be repeated.

Figure 5:
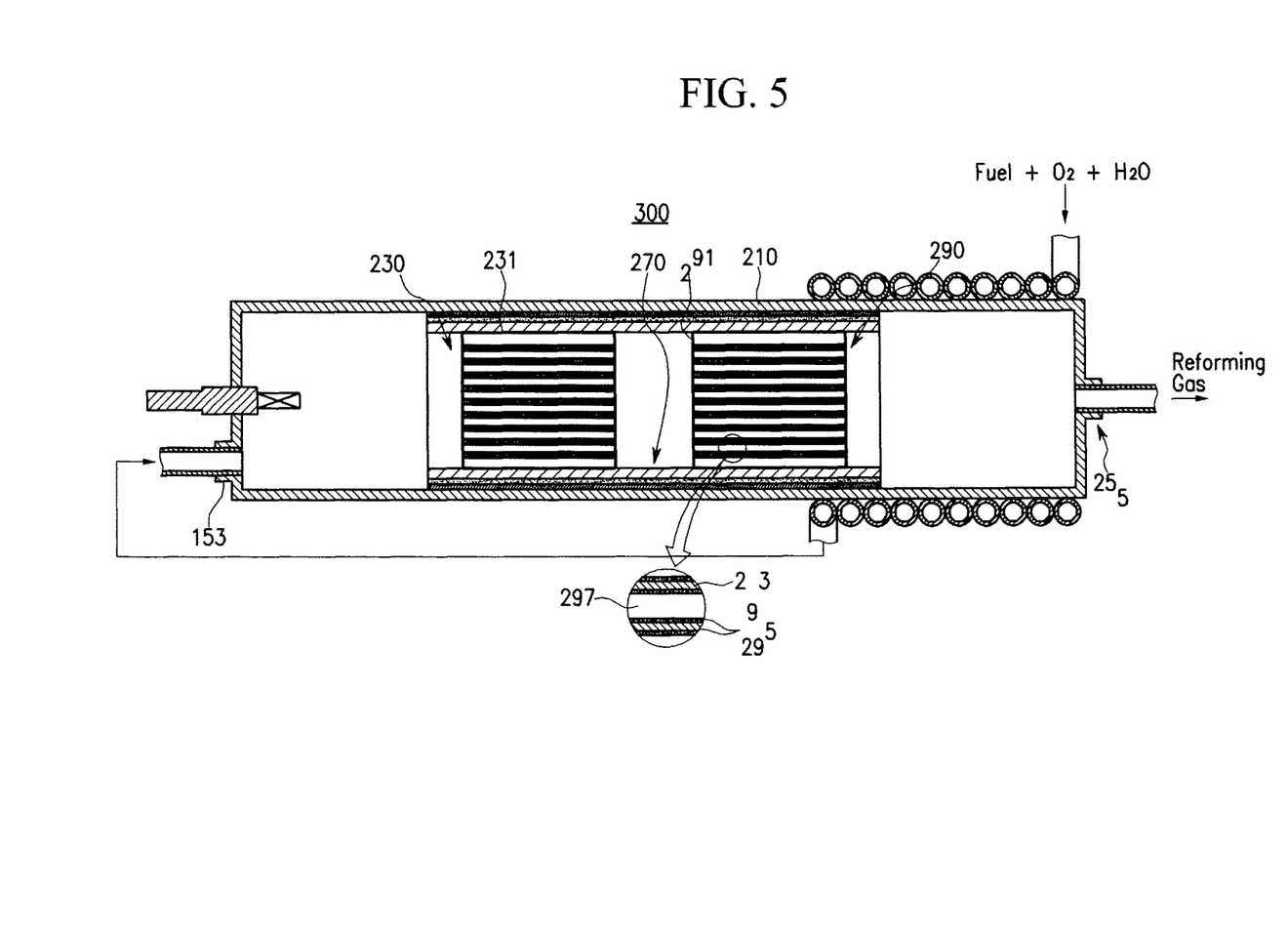
FIG. 5 is a schematic cross-sectional view of a fuel reforming apparatus according to yet another embodiment of the present invention.

FIG. 5 is a schematic cross-sectional view of a fuel reforming apparatus according to yet another embodiment of the present invention. Referring to FIG. 5, while employing the basic structure of the embodiment of FIG. 4, a fuel reforming apparatus 300 may further include a carbon monoxide reducing region 290 for reducing the concentration of carbon monoxide contained in the reforming gas.

The carbon monoxide reducing region 290 includes a second catalyst reaction region 291 for promoting a water gas shift (WGS) reaction of carbon monoxide. The second catalyst reaction region 291 promotes the WGS reaction of carbon monoxide as an exothermic reaction to reduce the concentration of carbon monoxide.

The second catalyst reaction region 291 is formed inside the heat-insulating member 270 and is spaced apart from the first catalyst reaction region 230. That is, the second catalyst reaction region 291 is spaced apart from the exit path of the first catalyst forming material 231 of the first catalyst reaction region 230. The second catalyst reaction region 291 includes a second catalyst layer 295 coated on a monolithic-type second catalyst forming material 293.

The second catalyst forming material 293 is disposed inside the heat-insulating member 270, and is a monolithic module produced by extruding a ceramic material or a metal material. The second catalyst forming material 293 forms a plurality of honeycomb-shaped second paths 297 parallel to the reactant flow direction.

The second catalyst layer 295 is coated on the interior walls of the plurality of second paths 297 of the second catalyst forming material 293. The second catalyst layer 295 is made of a typical catalyst material (nonlimiting examples of which include copper (Cu), zinc (Zn), iron (Fe), and chromium (Cr)) that can promote the WGS reaction of carbon monoxide.

Therefore, according to one embodiment, the reforming gas produced by the ATR reaction of the first catalyst reaction region 230 can contain a reduced concentration of carbon monoxide after the WGS reaction of carbon monoxide of the second catalyst reaction region 291. In this case, the reforming gas (with a reduced concentration of carbon monoxide) is discharged through the reforming gas outlet 255 of the reactor main body 210.

The remaining configuration and operation of the fuel reforming apparatus 300 according to the present embodiment are the same as those of the embodiment of FIG. 4, and thus detailed descriptions thereof will not be repeated.

According to embodiments of the present invention, a heat-insulating member including a quartz tube is included inside a reactor main body, making it possible to prevent the interior wall of the reactor main body from being oxidized when heat energy is generated by a POX reaction or an ATR reaction of a reactant by the use of a catalyst. Therefore, the formation of oxide particles can be prevented, and coke formation inside the reactor main body can be prevented. As a result, reaction efficiency, durability, and reliability of the entire apparatus can be further improved.

While this invention has been illustrated and described with reference to certain exemplary embodiments, it is understood by those of ordinary skill in the art that various modifications and changes to the described embodiments may be made without departing from the spirit and scope of the present invention, as defined in the appended claims.

What is claimed is:
1. A fuel reforming apparatus comprising:
a reactor main body;
a first catalyst reaction region inside the reactor main body for generating a reforming gas containing hydrogen by promoting at least a partial oxidation reaction of a reactant containing a hydrocarbon fuel and an oxidant;

a heat-insulating member inside the reactor main body surrounding the first catalyst reaction region, and insulating heat generated by the partial oxidation reaction, the heat-insulating member comprising a quartz tube made of a single crystal material; and a layer on a surface of the heat-insulating member and comprising a metal material, the layer being between the heat-insulating member and the reactor main body.

2. The fuel reforming apparatus of claim 1, wherein the heat-insulating member is separate from the reactor main body.

3. The fuel reforming apparatus of claim 1, wherein the layer comprises gold.

4. The fuel reforming apparatus of claim 1, further comprising a packing member between an inner circumferential surface of the reactor main body and an outer circumferential surface of the heat-insulating member, the packing member comprising a flame-retardant material.

5. The fuel reforming apparatus of claim 4, wherein the packing member comprises a material selected from the group consisting of quartz wools and glass wools.

6. The fuel reforming apparatus of claim 1, wherein the fuel reforming apparatus is a POX reactor for generating the reforming gas by the partial oxidation reaction of the reactant.

7. The fuel reforming apparatus of claim 1, wherein the fuel reforming apparatus is an auto-thermal reforming reactor for generating the reforming gas by a partial oxidation reaction and a steam reforming reaction of the reactant.

8. The fuel reforming apparatus of claim 7, wherein the reactant further contains water.

9. The fuel reforming apparatus of claim 1, wherein the first catalyst reaction region includes a monolithic catalyst forming material inside the reactor main body and a catalyst layer on the catalyst forming material.

10. The fuel reforming apparatus of claim 9, wherein the catalyst forming material comprises a plurality of paths in a longitudinal direction of the reactor main body, and wherein the catalyst layer is on an interior wall of each path.

11. The fuel reforming apparatus of claim 9, wherein the catalyst layer includes a catalyst material selected from the group consisting of Pt, Ru, Pd, Rh, Ir, and combinations thereof.

12. The fuel reforming apparatus of claim 1, wherein the reactor main body is generally tubular.

13. The fuel reforming apparatus of claim 1, further comprising an igniter at one end of the reactor main body for combusting the reactant inside the reactor main body, wherein the igniter heats the first catalyst reaction region to a reaction start temperature upon initial operation of the fuel reforming apparatus.

14. The fuel reforming apparatus of claim 1, further comprising:

a reactant inlet at one end of the reactor main body for injecting the reactant into the reactor main body; and a reforming gas outlet at another end of the reactor main body for discharging the reforming gas.

15. The fuel reforming apparatus of claim 8, further comprising an evaporator on the reactor main body for evaporating water contained in the reactant.

16. The fuel reforming apparatus of claim 15, wherein the evaporator includes a coiled tube in contact with an outer circumferential surface of the reactor main body, wherein the coiled tube comprises a path for the reactant.

17. The fuel reforming apparatus of claim 16, wherein an internal space of the reactor main body comprises a first section comprising the heat-insulating member, and a second section comprising an area outside of the heat-insulating member, and wherein the coiled tube is on the outer circumferential surface of the reactor main body corresponding to the second section.

18. The fuel reforming apparatus of claim 1, further comprising a carbon monoxide reducing region inside the reactor main body for reducing a concentration of carbon monoxide in the reforming gas.

19. The fuel reforming apparatus of claim 18, wherein the carbon monoxide reducing region includes a second catalyst reaction region for promoting a water gas shift reaction of the reforming gas.

20. The fuel reforming apparatus of claim 19, wherein the second catalyst reaction region is inside the heat-insulating member.

21. The fuel reforming apparatus of claim 19, wherein the second catalyst reaction region includes a monolithic-type second catalyst forming material and a second catalyst layer on the second catalyst forming material.

22. The fuel reforming apparatus of claim 1, wherein the fuel comprises a liquefied gas that exists in a gaseous state at room temperature.

* * * * *